(12) United States Patent
Small et al.

(10) Patent No.: US 11,042,773 B2
(45) Date of Patent: Jun. 22, 2021

(54) SYSTEMS AND METHODS FOR ACCELERATING DATA CAPTURE IN SENSORS

(71) Applicant: IDEX Biometrics ASA, Fornebu (NO)

(72) Inventors: Jeffrey A Small, Rochester, NY (US); Kenneth Jeffrey Stern, Newton Lower Falls, MA (US)

(73) Assignee: IDEX BIOMETRICS ASA, Oslo (NO)

( * ) Notice: Subject to any disclaimer, the term of this patent is extended or adjusted under 35 U.S.C. 154(b) by 135 days.

(21) Appl. No.: 16/245,839

(22) Filed: Jan. 11, 2019

(65) Prior Publication Data

US 2020/0226412 A1    Jul. 16, 2020

(51) Int. Cl.
*G06K 9/62* (2006.01)
*G06K 9/00* (2006.01)

(52) U.S. Cl.
CPC ......... *G06K 9/6202* (2013.01); *G06K 9/0002* (2013.01); *G06K 9/00033* (2013.01)

(58) Field of Classification Search
None
See application file for complete search history.

(56) References Cited

U.S. PATENT DOCUMENTS

| | | |
|---|---|---|
| 7,188,132 B2 | 3/2007 | Nakayama |
| 7,868,874 B2 | 1/2011 | Reynolds |
| 8,314,351 B2 | 11/2012 | Reynolds |
| 8,338,724 B2 | 12/2012 | Reynolds |
| 8,487,891 B2 | 7/2013 | Oda et al. |
| 8,558,811 B2 | 10/2013 | Reynolds |
| 8,592,697 B2 | 11/2013 | Hotelling et al. |
| 8,593,423 B2 | 11/2013 | Hotelling et al. |
| 8,682,949 B2 | 3/2014 | Matsushima |
| 8,729,911 B2 | 5/2014 | Maharyta et al. |
| 8,730,197 B2 | 5/2014 | Hamaguchi et al. |
| 8,809,702 B2 | 8/2014 | Reynolds |
| 8,952,916 B2 | 2/2015 | Reynolds |
| 8,970,544 B1 | 3/2015 | Mohindra |
| 8,982,091 B1 | 3/2015 | Mohindra |
| 9,012,793 B2 | 4/2015 | Reynolds |
| 9,069,408 B2 | 6/2015 | Hotelling et al. |

(Continued)

FOREIGN PATENT DOCUMENTS

| | | |
|---|---|---|
| CN | 102750056 A | 10/2012 |
| CN | 105830345 A | 8/2016 |

(Continued)

OTHER PUBLICATIONS

International Search Report and Written Opinion dated Apr. 17, 2020 issued in International application No. PCT/IB2020/050199. (15 pages).

*Primary Examiner* — Stephen T. Reed
(74) *Attorney, Agent, or Firm* — Rothwell, Figg, Ernst & Manbeck, P.C.

(57) ABSTRACT

Systems and methods for detecting a user's finger are provided. In some embodiments, a method may include applying a first electrical signal, applying a second signal, receiving a third electrical signal using a first electrode, receiving a fourth electrical signal using the first electrode, extracting the third and fourth electrical signals using a quadrature demodulator, and compensating for a phase delay between at least the first electrical signal and the third electrical signal.

22 Claims, 10 Drawing Sheets

(56) References Cited

U.S. PATENT DOCUMENTS

| | | |
|---|---|---|
| 9,176,621 B2 | 11/2015 | Lillie et al. |
| 9,323,398 B2 | 4/2016 | Bernstein et al. |
| 9,348,477 B2 | 5/2016 | Reynolds |
| 9,430,097 B2 | 8/2016 | Worfolk |
| 9,483,141 B2 | 11/2016 | Hotelling et al. |
| 9,639,733 B2 | 5/2017 | Kremin et al. |
| 9,696,863 B2 | 7/2017 | Reynolds |
| 9,710,112 B2 | 7/2017 | Han |
| 9,715,306 B2 | 7/2017 | Hotelling et al. |
| 2010/0060591 A1 | 3/2010 | Yousefpor et al. |
| 2011/0176037 A1 | 7/2011 | Benkley, III |
| 2012/0268142 A1 | 10/2012 | Kremin et al. |
| 2016/0140376 A1* | 5/2016 | Kremin ............... G06K 9/0002 382/124 |
| 2016/0148034 A1 | 5/2016 | Kremin et al. |
| 2016/0306467 A1 | 10/2016 | Reynolds |
| 2017/0322669 A1 | 11/2017 | Hotelling et al. |
| 2017/0351897 A1 | 12/2017 | Kremin et al. |
| 2018/0025202 A1* | 1/2018 | Ryshtun ............. G06K 9/00114 382/124 |

FOREIGN PATENT DOCUMENTS

| | | |
|---|---|---|
| WO | 2012143752 A2 | 10/2012 |
| WO | 2014021918 A1 | 2/2014 |
| WO | 2016/103215 A1 | 6/2016 |
| WO | 2016085560 A1 | 6/2016 |

\* cited by examiner

SYSTEMS AND METHODS FOR ACCELERATING DATA CAPTURE IN SENSORS

FIELD OF THE DISCLOSURE

This disclosure relates to sensors for the electronic sensing of objects located near or about a sensor, such as a position of a finger or features thereof.

BACKGROUND

Sensors may be used for detecting the presence of objects located near or about a sensor. Such sensors can be configured to sense electrical characteristics of an object in order to sense presence or location of an object near or about the sensor, physical characteristics of the object, shapes, textures on surfaces of an object, material composition, biological information, and other features and characteristics of an object being sensed. For example, a sensor may be configured to detect the presence or position of a user's finger, or in the exemplary case of a fingerprint sensor, one or more features (for example, ridges) of a user's finger.

For some sensors, a portion of the body such as a finger may be positioned near or in contact with the sensor in order to perform a measurement. In some cases, the sensor may apply a carrier signal that may be modulated when a body portion is placed near the sensor. The modulated carrier signal may then be received by the sensor. Because the modulation—rather than the carrier itself—contains the information of interest, it may be beneficial to cancel or compensate for the carrier. This may, for example, allow the dynamic range of the sensor to be better used to detect modulations applied by the body portion, thereby improving the accuracy of the sensor.

The signal path of a given transducing circuit within the sensor may, however, apply an unknown delay between the applied carrier signal and the received measurement signal. Due to this delay, the carrier signal and measurement signal may be out of phase with one another. As a result, it may be difficult to accurately cancel or compensate for the carrier. Accordingly, there is a need for systems and methods to account for phase delay in transducing circuits.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In some embodiments, a system for detecting a user's finger or other element is provided. The system may include a power source, a memory, and a processor. The system may be configured to apply a first electrical signal and a second signal. In some embodiments, the second signal may be out of phase with the first electrical signal. The system may be further configured to receive, using a first electrode, a third electrical signal that is powered, at least in part, by the first electrical signal. The third electrical signal may be received from a transducing circuit and including an indication as to whether the user's finger or other element is present at a first position. The system may be configured to receive, using the first electrode, a fourth electrical signal that is powered, at least in part, by the second electrical signal. The fourth electrical signal may include an indication as to whether the user's finger or other element is present at a second position. The fourth electrical signal may be received while the third electrical signal is being received.

The system may be configured to extract the third electrical signal and the fourth electrical signal using a quadrature demodulator, compensate for a phase delay between the first electrical signal and the third electrical signal, and compensate for a phase delay between the second electrical signal and the fourth electrical signal. The system may be configured to determine a first presence measurement at the first position based on the third electrical signal, and determine a second presence measurement at the second position based on the fourth electrical signal.

In some embodiments, a method for detecting a user's finger or other element is provided. The method may include applying a first electrical signal and applying a second signal, the second signal being out of phase with the first electrical signal. A third electrical may be received, using a first electrode, the third electrical signal being powered, at least in part, by the first electrical signal. The third electrical signal may be received from a transducing circuit and include an indication as to whether the user's finger or other element is present at a first position. A fourth electrical signal may be received, using the first electrode, the fourth electrical signal being powered, at least in part, by the second electrical signal. The fourth electrical signal may include an indication as to whether the user's finger or other element is present at a second position. The fourth electrical signal may be received while the third electrical signal is being received.

In some embodiments, the method may further include extracting the third electrical signal using a quadrature demodulator and extracting the fourth electrical signal using the quadrature demodulator. The method may include compensating for a phase delay between the first electrical signal and the third electrical signal, where the phase delay is associated with the transducing circuit. A first presence measurement at the first position may be determined based on the third electrical signal. In some embodiments, the method may include compensating for a phase delay between the second electrical signal and the fourth electrical signal, and based on the fourth electrical signal, determining a second presence measurement at the second position.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

Figure 1:
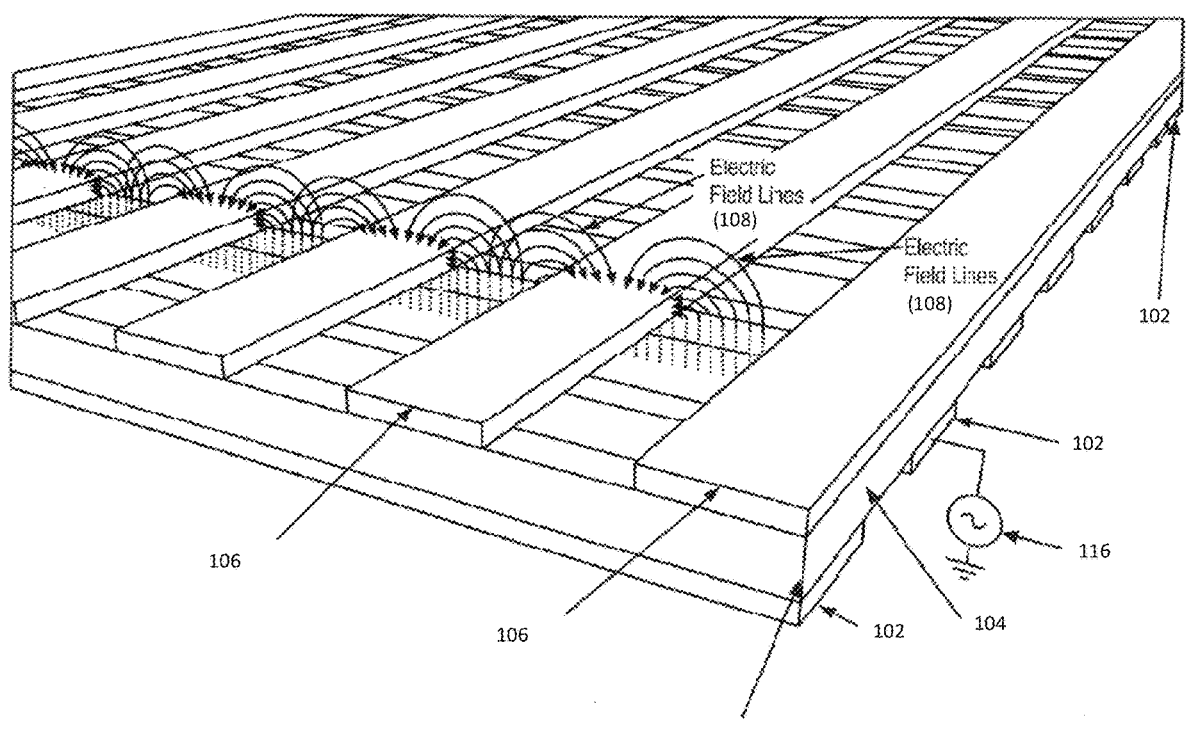
FIG. 1 depicts an exemplary embodiment of a sensor.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

As used herein, the term "noise" broadly includes disturbances generated by any of various random processes (e.g., flicker noise, shot noise) and also to interference that is substantially not correlated with the signals being acquired nor with the acquisition method.

As used herein, the term "array" broadly includes structured or unstructured data which may be defined, without limitation, along any number of dimensions.

The present disclosure may be incorporated into any suitable sensor, as will be understood by those of skill in the art. Such exemplary sensors may include touch screens, fingerprint sensors, or other sensors configured to detect the position of an object or feature thereof. For purposes of illustration, and not by way of limitation, the disclosure below discusses embodiments of two-dimensional sensors configured to detect the location of a user's finger or portion thereof. In some embodiments, exemplary sensors may include the general structure described in U.S. Pat. No. 8,421,890, which is incorporated herein by reference in its entirety.

In sensors such as touch screens and fingerprint sensors, noise can interfere with measurement accuracy. It is therefore desirable to minimize noise to the extent possible. For example, in U.S. Pat. No. 9,779,280, which is incorporated by reference herein in its entirety, a system combining reference and compensation electrodes with differential amplifiers is used to improve the rejection of typical conducted and radiated noise sources found in sensors such as fingerprint sensors. Another strategy for minimizing noise is disclosed in U.S. patent application Ser. No. 15/869,214, which is incorporated by reference herein in its entirety. As disclosed in U.S. patent application Ser. No. 15/869,214, signals corresponding to groups of pixels may be modulated and demodulated according to patterns in order to compensate for common mode noise. Disclosed in the present application are techniques for improving data capture rate, signal-to-noise ratio (SNR), and/or signal-to-interference ratio (SIR). The techniques disclosed herein can be combined with the noise compensation strategies discussed in U.S. Pat. No. 9,779,280 and U.S. patent application Ser. No. 15/869,214.

FIG. 1 depicts an exemplary embodiment of a sensor 100. The sensor 100 may include a plurality of pickup lines 106 disposed along a top surface of an insulating layer 104. In some embodiments, the insulating layer 104 may include a dielectric substrate. The sensor may further include a plurality of drive lines 102. The drive lines 102 may be arranged to intersect one or more of the pickup lines. In some embodiments, the drive lines 102 may be oriented perpendicularly relative to the pickup lines. Each of the drive lines 102 may be operatively coupled to a power source 116 and configured to apply an electrical signal in an area surrounding the respective drive line 102. For example, the drive lines may be configured to apply an electric field including electric field lines 108 as illustrated in FIG. 1. In some embodiments, the power source 116 may be a battery, capacitor, inductor, generator, or other element capable of applying power.

In some embodiments, one or more (or each) of the pickup lines 106 may be configured to receive an electrical signal and transmit the received signal into circuitry proximate the respective pickup line 106. In some embodiments, the pickup lines 106 may be configured to receive electromagnetic fields applied by the drive lines 102, subject to any modification of the electric field caused by, for example, the presence of an object placed within the range of the electric fields. In this manner, a pickup line 106 may be configured to receive electrical signals containing an indication as to whether an object or component thereof is within range of the electrical field received by the respective pickup line 106.

In some embodiments, the drive lines 102 and pickup lines 106 may be arranged in a grid whereby each intersection (which may also be referred to herein as a pixel) of a respective drive line and pickup line may function as a transducing circuit configured to output a signal containing an indication as to whether an object is in range of the electric field received by the respective pickup line. As discussed in greater detail below, the information from each intersection may be collected and processed to determine the location of an object or features thereof across a two-dimensional sensor surface.

Note that other sensor embodiments may be equivalently used and combined with the disclosure herein, and the above description should not be construed as limiting in any way. For example, self- or absolute-capacitance sensors, as well as mutual capacitance may be equivalently used with the processing techniques and technical approaches discussed herein. As another example, other layouts of drive and pickup lines rather than grids may be used, e.g. concentric rings, diamond patterns and so on.

Figure 2:
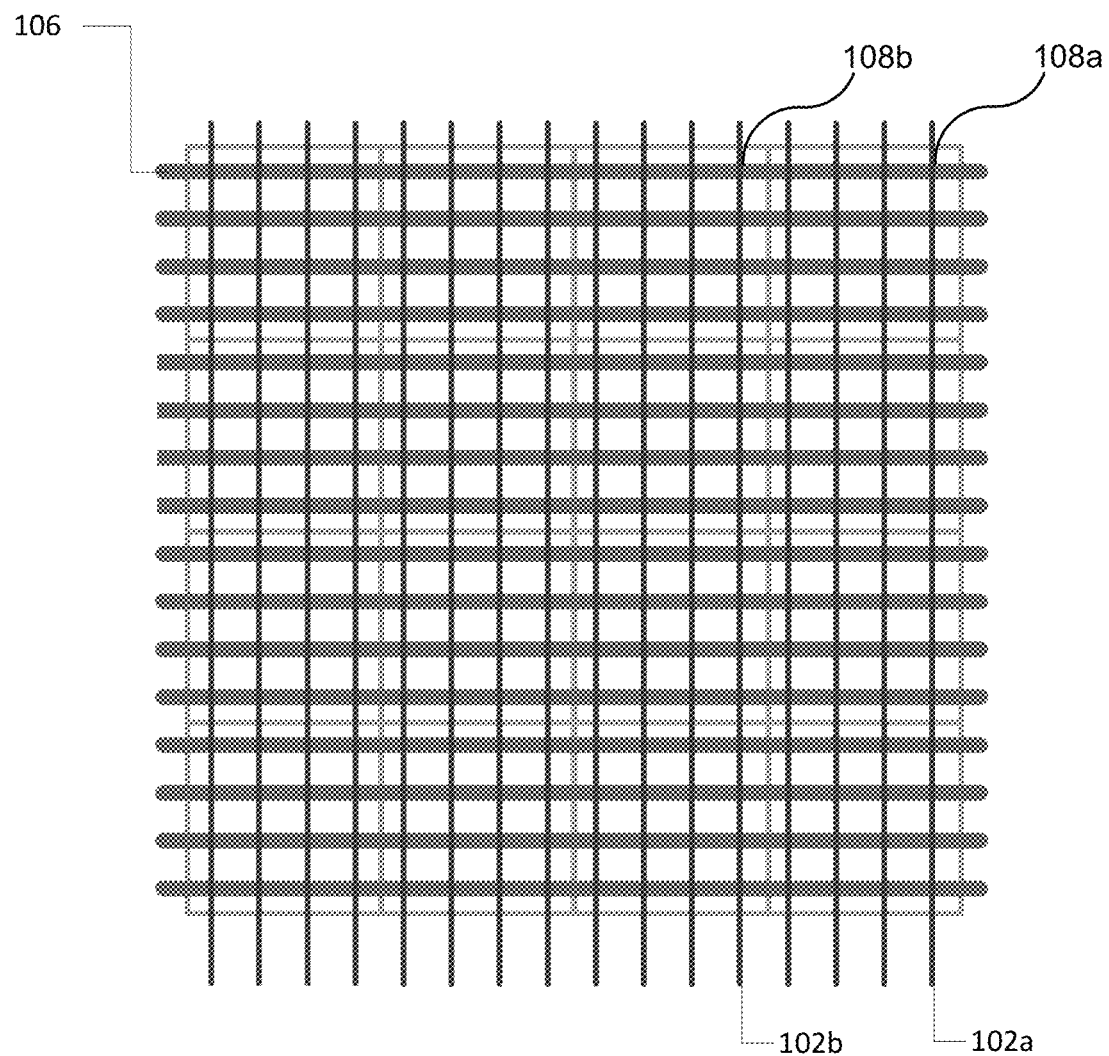
FIG. 2 depicts schematic view of an exemplary sensor grid.

FIG. 2 illustrates an exemplary schematic diagram of a 2-dimensional grid comprised of intersecting pickup lines 106 and drive lines 102*a*, 102*b*. As explained above, each intersection of a drive line and a pickup line may function as a transducing circuit configured to detect the presence of an object or feature thereof in a localized region (e.g., a pixel) surrounding that respective intersection. By way of example, a first drive line 102*a* is shown intersecting a first pickup line 106 at a first intersection 108*a*, and a second drive line 102*b* is shown intersecting the first pickup line 106 at a second intersection 108*b*. The signal pathway along the first drive line 102*a*, across the first intersection 108*a*, and along the first pickup line 106 may define a first transducing circuit configured to detect the presence of a user's finger or other object within proximity about the first intersection 108*a*. This proximity about the first intersection 108*a* may define a first pixel in the sensor grid. The signal pathway along the second drive line 102*b*, across the second intersection 108*b*, and along the first pickup line 106 may define a second transducing circuit configured to detect the presence of a user's finger or other element within a proximity about the second intersection 108*b*. The proximity about the second intersection 108*a* may define a second pixel in the sensor grid. The sensor grid may include any number of intersecting lines, and in this manner, any number of transducing circuits and pixels may be provided.

In some embodiments, a first measurement may be performed by applying an electrical signal along first drive line 102*a*. This electrical signal may apply an electric field at the first intersection 108*a*. This electric field may in turn power, at least in part, an electrical signal along the first pickup line 106. If a user's finger or other element is present at or near the first intersection 108*a*, the electric field applied at the first intersection 108*a* may be modulated. Thus, the electrical signal received at the first pickup line 106 may differ depending on whether or not the user's finger is present at the first intersection 108*a*. The received electrical signal can therefore be understood to include an indication as to whether the user's finger is present within a proximity of the first intersection 108*a*. The signal received by the pickup line 106 may then be detected and processed by receiving circuitry operably coupled to the first pickup line 106 to determine a first presence measurement indicating whether the user's finger is present within the proximity of the first intersection 108*a*.

In some embodiments, a second measurement may be performed by applying an electrical signal along second drive line 102*b*. This electrical signal may apply an electric field at the second intersection 108*b*. This electric field may in turn power, at least in part, an electrical signal along the first pickup line 106. If a user's finger or other element is present at or near the second intersection 108*b*, the electric field applied at the second intersection 108*b* may be modulated. Thus, this electrical signal received at the first pickup line 106 may differ depending on whether or not the user's finger is present at the second intersection 108*b*. The received electrical signal can therefore be understood to include an indication as to whether the user's finger or other element is present within a proximity of the second intersection 108*b*. This signal received by the pickup line 106 may then be detected and processed by receiving circuitry operably coupled to the first pickup line 106 to determine a second presence measurement indicating whether the user's finger is present within the proximity of the second intersection 108*b*.

Each intersection within a given sensor grid may be sampled in this manner. The sensor grid may optionally be divided into logical groups, as reflected in FIG. 2, which may be used for sampling using code division multiplexing, as described in in U.S. patent application Ser. No. 15/869, 214. Because each pickup line may intersect any number of drive lines and may therefore be configured to receive presence measurements from a plurality of intersections, there is a need to ensure that a given measurement may be correlated with a given intersection on the sensor grid. This may be accomplished, for example, by activating only one drive line at a time. For example, the first drive line 102*a* may apply an electrical signal during a first timeslot, and the second drive line 102*b* may apply an electrical signal during a second timeslot. The signal received by the first pickup line 106 during the first timeslot may therefore be correlated with the intersection 108*a* between the first pickup line 106 and the first drive line 102*a*, and the signal received by the first pickup line 106 during the second timeline may be correlated with the intersection 108*b* between the first pickup line 106 and the second drive line 102*b*.

In this manner, each drive line across a sensor grid may be activated one-at-a-time within its respective timeslot. Activating a single drive line per timeslot limits the rate at which the sensor may capture data. This limited data capture rate, in turn, limits the opportunity to resample pixels, which could otherwise be used to improve SNR and/or SIR of the sensor's measurements.

Figure 3:
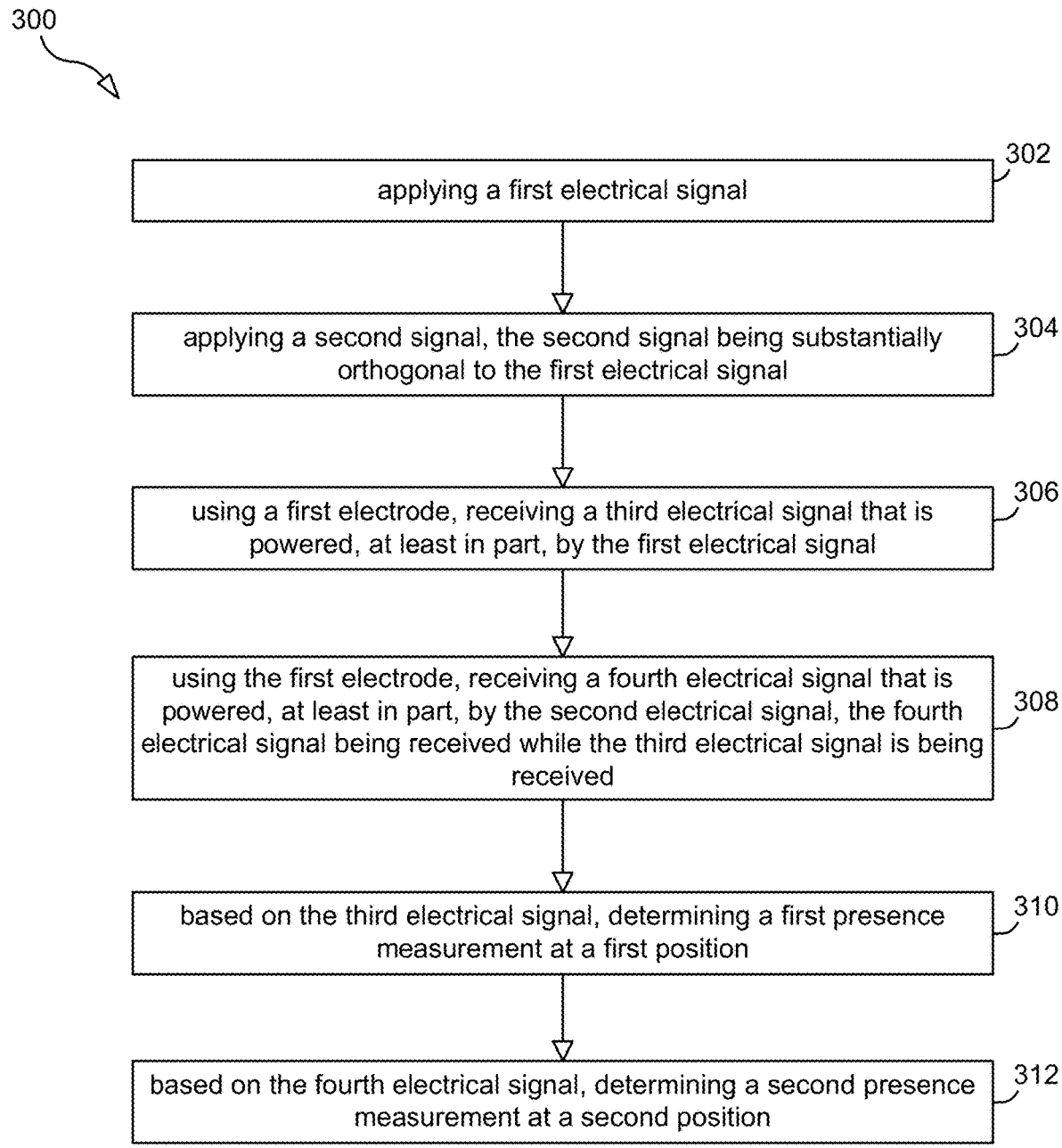
FIG. 3 illustrates an exemplary method for improving data capture rate in a sensor.

FIG. 3 illustrates an exemplary method 300 for improving data capture rate in a sensor. In step 302, a first electrical signal may be applied. In some embodiments, the first electrical signal may be applied by a first drive line (for example, drive line 108*a*). In step 304, a second electrical signal may be applied. In some embodiments, the second electrical signal may be applied by a second drive line (for example, drive line 108*b*) different than the first drive line. In other embodiments, the second electrical signal may be applied by the same drive line on which the first electrical signal is applied (for example, both signals may be applied by drive line 108*a*). In some embodiments, the second electrical signal may be substantially orthogonal to the first electrical signal. For example, the first electrical signal may be embodied as a sine wave, and the second electrical signal may be embodied as a cosine wave of the same frequency.

In another example, the first electrical signal may be embodied as a square wave, and the second electrical signal may be embodied as a square wave of the same frequency and shifted 90 degrees out of phase relative to the first electrical signal. In yet another example, the first electrical signal may have substantially only a real component, and the second electrical signal may have substantially only an imaginary component. Other embodiments of orthogonal signals may be used.

In some embodiments, the second electrical signal may be applied while the first electrical signal is being applied. For example, in a given sensor grid having N drive lines, a scanning period may be divided into N/2 timeslots, and for each timeslot, two different drive lines may be activated using orthogonal signals. In this case, the entire sensor grid may be sampled using N/2 timeslots, effectively doubling the data capture rate relative to an embodiment in which drive lines are activated one-at-a-time. In another example, the scanning period may be divided into N timeslots, and for each timeslot, two orthogonal signals may be applied, optionally both on the same drive line. In this case, twice as many data points are collected during the scanning period of N timeslots, which may be used to improve the SNR and/or SIR of the sensor. In other embodiments, a hybrid of these approaches may be used. For example, the sensor may by default activate two different drive lines to collect data from different positions on the sensor, but when SNR and/or SIR is determined to exceed a threshold value—either for a given pixel, group of pixels, an entire sensor scan, or a series of sensor scans—the accelerated data capture rate may instead be used to re-sample pixels in order to improve SNR and/or SIR.

In step 306, a first electrode may receive a third electrical signal. In some embodiments, the third electrical signal may be powered, at least in part, by the first electrical signal, and the third electrical signal may include an indication as to whether the user's finger or other element is present at a first position. For example, the third electrical signal may be received from a pickup line (for example, pickup line 106, which is an example of an electrode) that intersects the drive line along which the first electrical signal is applied, and the third electrical signal may include an indication as to whether the user's finger or other element is present within a proximity of that intersection. In such a case, the first electrode may be embodied as the pickup line itself, an electrode in a receiving circuit operably coupled to the pickup line, or another electrode configured to receive the third electrical signal.

In step 308, the first electrode may receive a fourth electrical signal. In some embodiments, the fourth electrical signal may be powered, at least in part, by the second electrical signal, and the fourth electrical signal may include an indication as to whether the user's finger or other element is present at a second position. For example, the fourth electrical signal may be received from a pickup line that intersects the drive line along which the second electrical signal is applied, and the fourth electrical signal may include an indication as to whether the user's finger or other element is present within a proximity of that intersection. In some embodiments, the first electrode may be embodied as the pickup line itself (for example, pickup line 106), an electrode in a receiving circuit operably coupled to the pickup line, or another electrode configured to receive the fourth electrical signal. In some embodiments, the fourth electrical signal may be received along the first electrode while the third electrical signal is being received.

In step 310, a first presence measurement at the first position may be determined based on the third electrical signal. In step 312, a second presence measurement at the second position may be determined based on the fourth electrical signal. In some embodiments, steps 310 and 312 may be performed using a processor and/or receiving circuitry in a sensor system. In embodiments where the third and fourth electrical signals are received along the same electrode, it may be beneficial to separate the third and fourth electrical signals from one another. This may be facilitated by the orthogonality of the first and second electrical signals. Since the third and fourth electrical signals may be powered, at least in part, by orthogonal signals, the third and fourth signals may also be orthogonal to one another. Thus, the receiving circuitry and/or processor may extract the third electrical signal and the fourth electrical signal from a combined signal received along the first electrode. In some embodiments, this extraction may be performed using I/O (in phase, quadrature) circuitry, such as the exemplary circuitry shown in FIG. 10. The extracted third and fourth signals may then be analyzed to determine whether these signals bear a modulation indicating the presence of a user's finger or other element. Optionally, the system may compensate for a phase delay between the first electrical signal and the third electrical signal as described below, including with respect to FIGS. 5-8.

In optional step 314, a new set of drive lines and/or pickup lines are selected, and steps 302-312 are applied with respect to the selected drive lines and pickup lines. These steps may be repeated as many times as desired to collect data from a desired region of a sensor. For example, measurement data may be collected from some or all of the pixels in a region of the sensor, which may optionally include the entire sensor grid. In some embodiments, steps 302-312 are applied to one drive line or one pair of drive lines at a time in series until each drive line in the sensor grid has been activated at least once. In some embodiments, the sequence is terminated after each drive line has been activated at least once.

As noted above, method 300 allows the data capture rate to be doubled relative to a system in which drive lines are activated one-at-a-time. Accelerated data capture may also be used to improve the sensor's SNR and/or SIR. In embodiments where I/O circuitry is used to extract orthogonal components of simultaneously received signals, however, a different problem may arise. Specifically, each transducing circuit in a sensor grid may have an associated delay, which may be related to the time required for the signal to pass along a drive line, across an intersection, and along a pickup line and receiving circuitry coupled to that pickup line. This delay may be the same or different for each transducing circuit in a sensor. Moreover, the delay may, in some embodiments, vary over time depending on operating temperature, age or wear, battery condition, and other variables. Due to the delay in a given transducing circuit, the received signal used to perform measurements may be at least partially out of phase with a driving signal used to power that received signal.

This phase delay can present at least two problems. First, the amplitude of the carrier signal used to power a given measurement can be much larger than the amplitude of the modulation that the sensor seeks to measure. Unless the modulation is isolated from the carrier, the higher-amplitude carrier can obscure the lower-amplitude modulation, thereby reducing SNR, SIR, and/or measurement sensitivity. In some embodiments, direct carrier injection may be used to substantially cancel the carrier, thereby isolating any modulation applied by a user's finger. If the received signal is out-of-phase with injected carrier, however, the injected carrier will be less effective in canceling the carrier received in the measurement signal.

Second, if the received signals are partially out-of-phase with what is expected by the I/O receiving circuitry, the signal that is intended to be contained within the I-channel may leak out onto the Q-channel, and the signal that is intended to be contained within the Q-channel may leak out onto the I-channel. This cross-talk renders accurate extraction of the two signals difficult, and reduces SNR and/or SIR.

Figure 4:
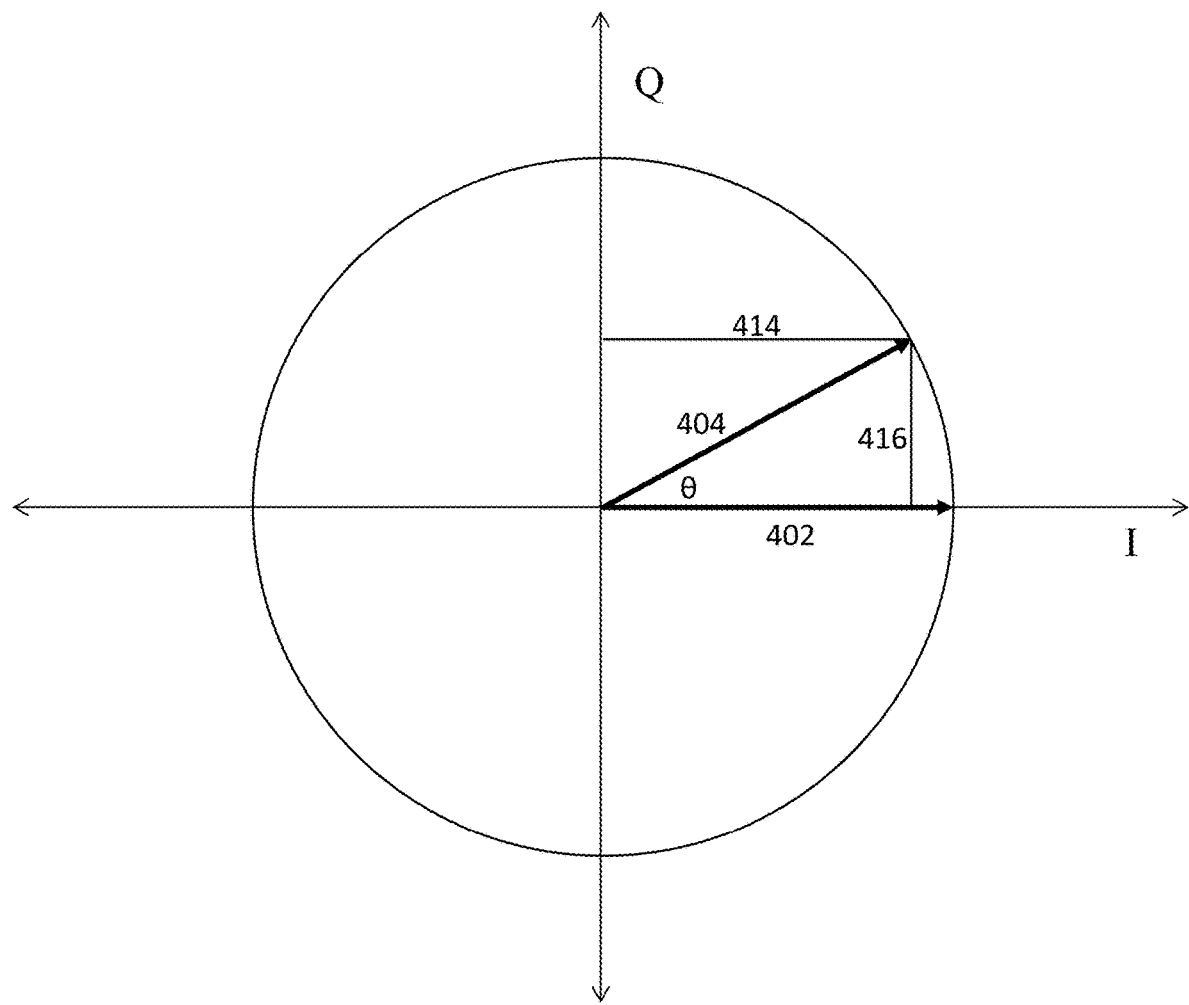
FIG. 4 is a mathematical schematic illustrating an exemplary phase delay.

FIG. 4 is a mathematical schematic illustrating an exemplary phase delay in an I/O coordinate system. In this exemplary schematic, a first signal 402, which may correspond to a carrier signal applied by a drive line, lies substantially along the I-axis. The first signal may therefore have a nonzero I-component (in-phase component, or real component) and a Q-component (quadrature component, or imaginary component) of substantially zero. A second signal 404, which may correspond to a signal received by a pickup line, may be shifted by θ degrees relative to the first signal 402. The second signal may have a nonzero I-component 414 and a nonzero Q-component 416.

In a case where the first signal 402 is a driving signal passed along a drive line and the second signal 404 is a signal received by a pickup line intersecting the drive line, the shift θ may represent a phase delay θ associated with a transducing circuit comprised of that drive line and pickup line. For example, the second signal 404 may be θ degrees out of phase with the first signal 402 due to a delay associated with the transducing circuit along which the signals are passed. As a result of this phase delay θ, an I/O circuit configured to isolate the I- and Q-components of the second signal 404 will obtain nonzero values for both components, notwithstanding that the driving signal 402 was purely within the I-channel. As noted above, this presents challenges for measurement and carrier cancellation. By determining and compensating for the phase delay θ between a driving signal 402 and a received signal 404, measurement accuracy may be improved.

Figure 5:
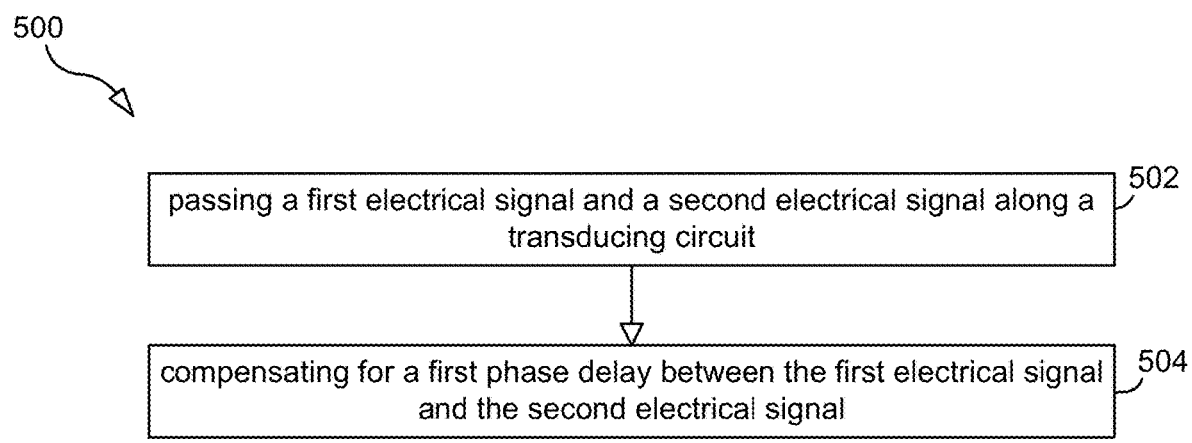
FIG. 5 illustrates an exemplary method for compensating for phase delay.

FIG. 5 illustrates an exemplary embodiment 500 for compensating for the phase delay associated with a transducing circuit. In step 502, a first electrical signal and a second electrical signal may be passed along a transducing circuit. In some embodiments, the first electrical signal may be a driving signal, and the second electrical signal may be a received signal powered at least in part by the first electrical signal. The transducing circuit may be associated with a phase delay θ. Thus, the second electrical signal may be θ degrees out of phase with the first electrical signal. In step 504, the phase delay θ may be compensated or otherwise canceled. In some embodiments, this may be performed by shifting the phase of the second signal (e.g., the second signal itself, a processed version of the second signal, or data obtained from the second signal) in a direction opposite the phase delay θ associated with the transducing circuit. Optionally, this may include determining a phase delay parameter and modulating the second electrical signal using a phase delay parameter.

Figure 6:
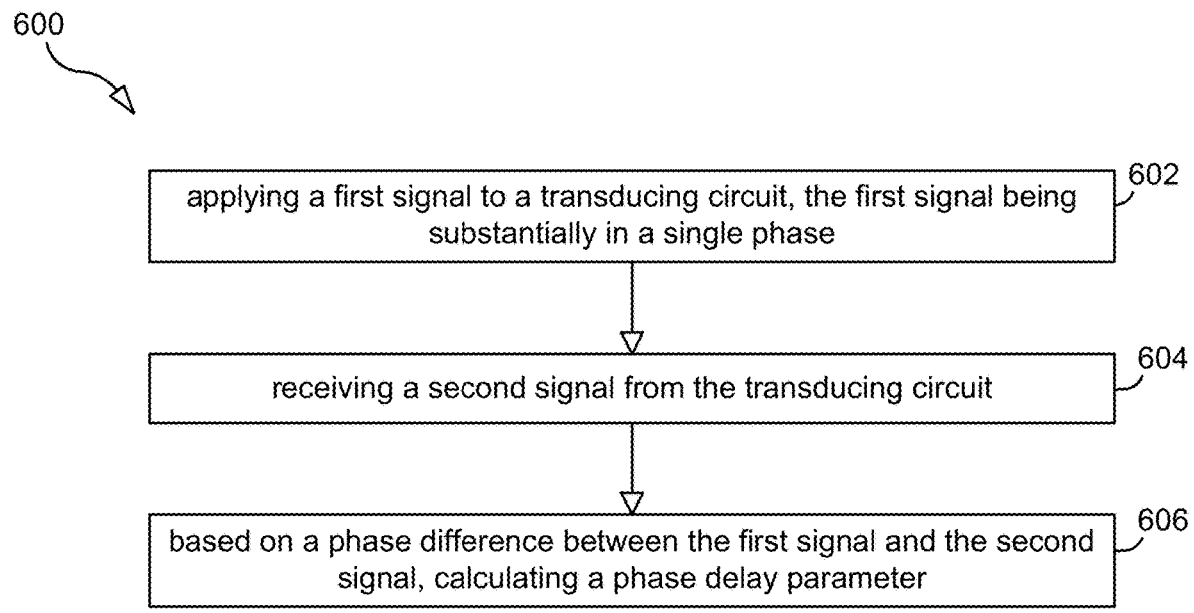
FIGS. 6-8 illustrate exemplary methods for determining phase delay
Figure 7:
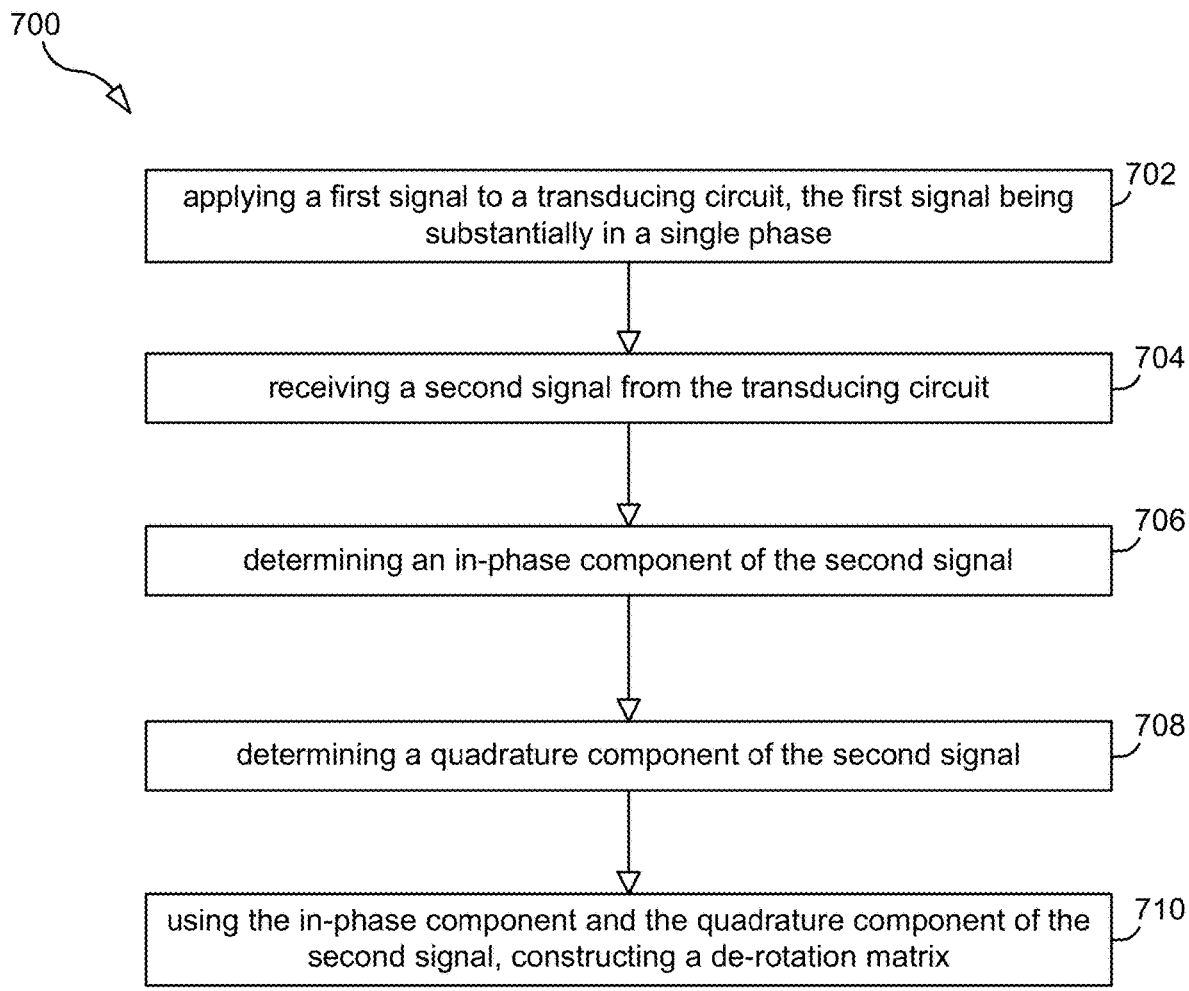
Figure 8:
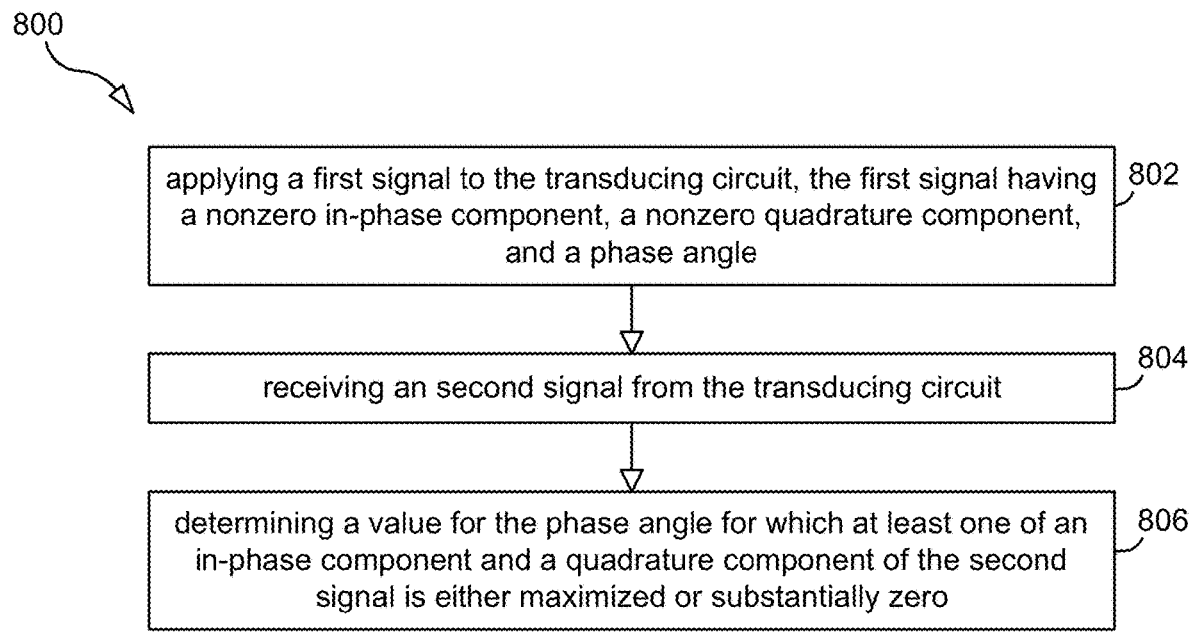

FIGS. 6-8 illustrate exemplary methods for determining phase delay parameters. These methods may be combined with those discussed with respect to FIGS. 3 and 5, and each of the methods disclosed herein may be performed by systems discussed with respect to FIGS. 1, 2, and 9.

FIG. 6 illustrates an exemplary method 600 for determining phase delay parameters. In step 602, a first signal may be applied to a transducing circuit in a sensor. In some embodiments, the transducing circuit may be comprised of a drive line that intersects a pickup line as described above. In some embodiments, the first signal may be substantially in a single phase. For example, in the I/O coordinate plane illustrated in FIG. 4, the first signal could be entirely within an I-channel or entirely within a Q-channel. In step 604, a second signal may be received from the transducing circuit. In some embodiments, the second signal may be powered at least partially by the first signal. In some embodiments, the second signal may be received by a pickup line from a position proximate the intersection with the drive line. In step 606, a processor may calculate the phase delay parameter based on a phase difference between the first signal and the second signal. In some embodiments, this may be accomplished by performing trigonometric operations on I/O components in the received second signal and calculating a phase shift relative to the applied first signal, which may be known to have been in a single phase.

FIG. 7 illustrates another exemplary method 700 for determining phase delay parameters. As explained below, this method may be used without performing trigonometric calculations, and may therefore use processing resources particularly efficiently. Instead, a phase delay parameter may be represented by a de-rotation matrix, and the values in the de-rotation matrix may be populated from measurements performed by the sensor. In step 702, a first signal may be applied to a transducing circuit in a sensor. In some embodiments, the transducing circuit may be comprised of a drive line that intersects a pickup line as described above. In some embodiments, the first signal may be substantially in a single phase. For example, in the I/O coordinate plane illustrated in FIG. 4, the first signal could be entirely within an I-channel or entirely within a Q-channel. In step 704, a second signal may be received from the transducing circuit. In some embodiments, the second signal may be powered at least partially by the first signal. In some embodiments, the second signal may be received by a pickup line from a position proximate the intersection with the drive line. In step 706, an in-phase component of the second signal may be determined. In step 708, a quadrature component of the second signal may be determined. In some embodiments, steps 706 and 708 may be performed using I/O receiving circuitry. In some embodiments, steps 706 and 708 may be performed using direct measurements and without performing trigonometric calculations. In step 710, the de-rotation matrix may be constructed using the determined in-phase component and quadrature component of the second signal. In some embodiments, this may include populating the values of a rotation matrix using values determined from the in-phase and quadrature components of the second signal.

Exemplary mathematical calculations suitable for use in performing method 700 are set forth below. Consider the following variables:
I=in-phase driving signal (e.g., real component)
Q=quadrature driving signal (e.g., imaginary component)
I'=in-phase component of received signal
Q'=quadrature component of received signal
For a complex transmitted value $$\begin{bmatrix} I \\ Q \end{bmatrix}$$

at any given timeslot and an unknown rotation caused by system delays, the received values may be:

$$\begin{bmatrix} I' \\ Q' \end{bmatrix} = \begin{bmatrix} \cos\theta & -\sin\theta \\ \sin\theta & \cos\theta \end{bmatrix} \begin{bmatrix} I \\ Q \end{bmatrix}$$

The values of $\cos\theta$ and $\sin\theta$ are unknown, but these may be determined by transmitting only real-valued signal. Then, the received values may be represented by the following equation:

$$\begin{bmatrix} I' \\ Q' \end{bmatrix} = \begin{bmatrix} \cos\theta & -\sin\theta \\ \sin\theta & \cos\theta \end{bmatrix} \begin{bmatrix} 1 \\ 0 \end{bmatrix} = \begin{bmatrix} \cos\theta \\ \sin\theta \end{bmatrix}$$

These values for $\sin\theta$ and $\cos\theta$ may then be used to populate a de-rotation matrix, which may be represented as follows:

$$\begin{bmatrix} \cos\theta & \sin\theta \\ -\sin\theta & \cos\theta \end{bmatrix}$$

Following construction of the de-rotation matrix, compensated values $$\begin{bmatrix} a \\ b \end{bmatrix}$$

(e.g., values for which phase delay associated with a transducing circuit have been compensated) may be determined from received values $$\begin{bmatrix} a' \\ b' \end{bmatrix}$$

by multiplying the received vector $$\begin{bmatrix} a' \\ b' \end{bmatrix}$$

by the de-rotation matrix. This may be represented by the following equation:

$$\begin{bmatrix} a' \\ b' \end{bmatrix} \begin{bmatrix} \cos\theta & \sin\theta \\ -\sin\theta & \cos\theta \end{bmatrix} = \begin{bmatrix} \cos\theta & -\sin\theta \\ \sin\theta & \cos\theta \end{bmatrix} \begin{bmatrix} a \\ b \end{bmatrix} \begin{bmatrix} \cos\theta & \sin\theta \\ -\sin\theta & \cos\theta \end{bmatrix} = \begin{bmatrix} a \\ b \end{bmatrix}$$

Thus, the desired values $$\begin{bmatrix} a \\ b \end{bmatrix}$$

may be determined.

The above calculations are merely exemplary, and other calculations can be used without departing from the scope of method 700 described above.

FIG. 8 illustrates another exemplary method 800 for determining phase delay parameters. In step 802, a first signal may be applied to a transducing circuit in a sensor. In some embodiments, the transducing circuit may be comprised of a drive line that intersects a pickup line as described above. In some embodiments, the first signal may have a nonzero in-phase component, a nonzero quadrature component, and a phase angle. In step 804, a second signal may be received from the transducing circuit. In some embodiments, the second signal may be powered at least partially by the first signal. In some embodiments, the second signal may be received by a pickup line from a position proximate the intersection with the drive line. In step 806, a processor may determine a value for the phase angle for which at least one of an in-phase component and a quadrature component of the second signal is either maximized or substantially zero. In some embodiments, this may be performed by incrementally varying the phase angle of the first signal and measuring one or both of the I- and Q-components of the second signal. When either the I-component or Q-component is at a maximum (or substantially zero), the phase angle for the first signal that produced this result may be determined and stored in memory.

As explained above, each of the methods described with respect to FIGS. 6-8 permit one or more phase delay parameters to be determined. In some embodiments, the methods described with respect to FIGS. 6-8 are particularly advantageous when used in combination with driving signals embodied as periodic carrier waveforms that do not contain even harmonics.

In some embodiments, each determined phase delay parameter may represent a phase delay associated with a transducing circuit upon which the respective method is performed. In some embodiments, a sensor may have multiple transducing circuits, and each transducing circuit may have its own associated phase delay. In such cases, it may be appropriate to perform the methods described above with respect to each transducing circuit in the sensor. For example, a phase delay parameter for each transducing circuit may be determined in a single scanning cycle by activating each drive line one-at-a-time. The activation may be performed in sequence from one end of the sensor to the other, or alternatively, the activation sequence may follow any other suitable pattern. In some embodiments, the phase delay for one or more transducing circuits may be representative of the phase delay in the other transducing circuits in a sensor. In these embodiments, it may be appropriate to determine phase delay parameters for one or more representative transducing circuits, and then apply the resulting parameters in calculations for transducing circuits whose phase delay parameters were not directly calculated. In some embodiments, the group of representative transducing circuits may be alternated over the course of multiple parameter determination sequences. In this manner, discrepancies between expected values and measured values may be determined, and the assumption of representativeness may be validated over time.

In some embodiments, phase delay parameters may change over time depending on operating conditions as described above. In these cases, it may be beneficial to determine phase delay parameters for one, some, or all of the transducing circuits shortly before a measurement is performed. In a fingerprint sensing embodiment, for example, it may be advantageous to determine phase delay parameters shortly before performing a measurement to enroll a figure to thereby improve accuracy of a template image. In some embodiments, a sensor may be set to determine phase delay parameters at regular intervals, the length of which may be determined in accordance with an expected stability of those parameters over time. In some embodiments, the sensor may determine phase delay parameters shortly before a measurement is performed, such as less than five minutes, three minutes, one minute, thirty seconds, ten seconds, five seconds, or one second, one tenth of a second, one hundredth of a second, or one thousandth of a second before a measurement is performed.

In other embodiments, the sensor may be set to determine phase delay parameters in response to a determination that one or more events has occurred. In some embodiments, a phase delay determination sequence may be triggered in response to receiving a request to perform a measurement. In other embodiments, a phase delay determination sequence may be triggered in response to occurrence of an event associated with a change in conditions that is likely to effect a change in phase delay parameters. For example, a processor may initiate a phase delay parameter determination sequence upon detecting that an operating temperature of the sensor has exceeded a threshold value or range. In some embodiments, a threshold range may be determined based on an operating temperature associated with a prior determination of phase delay parameters. For example, if phase delay parameters were last determined at an operating temperature of 20° C., a new determination sequence could be initiated upon detecting that the operating temperature has deviated more than 5° C. from the temperature at which the last determination sequence was performed (i.e., the operating temperature has exceeded a range of 15° C. to 25° C.). In some embodiments, a number of times that the sensor has been used may be counted, and a phase delay determination sequence may be initiated when a predetermined number of uses have occurred. Other events that could be used to trigger determination sequences may include changes in power supply to the sensor beyond a predetermined range, a sequence of one or more measurements commonly associated with measurement errors (for example, a sequence of failed authentication attempts in a biometric sensor), or a request (e.g., from a user, an application or component on a device incorporating the sensor, a service provider, or a network entity) for certain processes to be performed, such as phase delay calculation, calibration, or enrollment of new biometric data (e.g., in the exemplary case of a fingerprint sensor).

In some embodiments, phase delay parameters may be predetermined factory calibration parameters. For example, one or more phase delay determination sequences may be performed prior to delivery of the sensors to end users, and the resulting parameters may be stored in non-volatile memory. Using predetermined factory calibration may reduce power consumption, and may be particularly advantageous where phase delay parameters are expected to be substantially stable.

Figure 9:
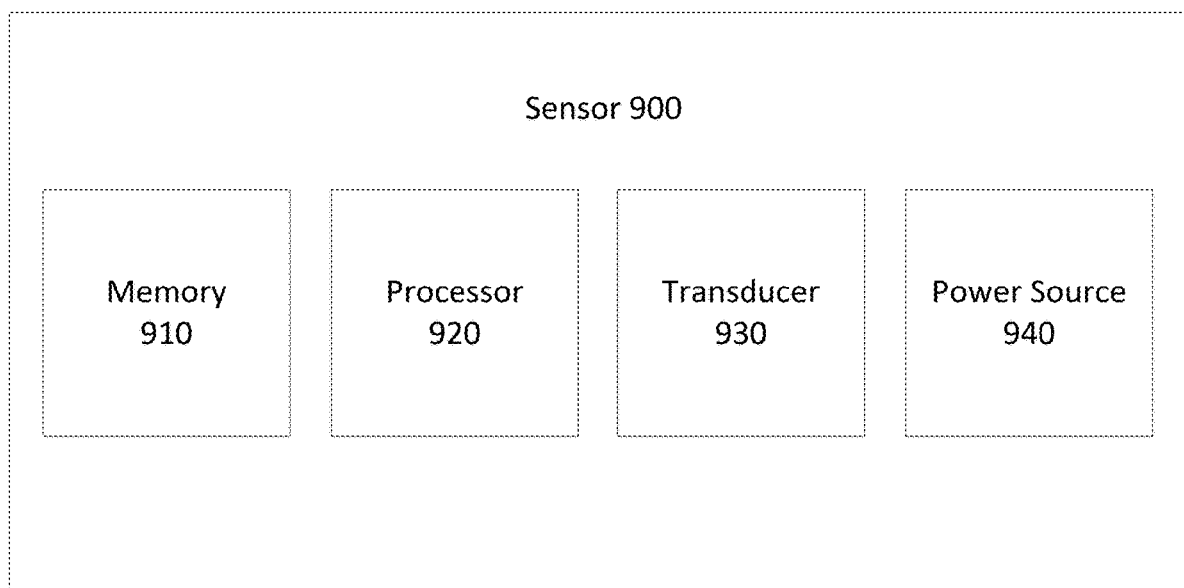
FIG. 9 depicts a schematic view of an exemplary sensor.

FIG. 9 illustrates a figurative diagram of an exemplary sensor system 900. The sensor system 900 may include a memory 910, a processor 920, a transducer 930, and a power source 940 and circuitry to connect them. In some embodiments, the transducer 930 may be embodied as a two-dimensional grid of pickup lines and drive lines as described above. In some embodiments, the transducer 930 may include a plurality of transducing circuits. The memory 910 may store instructions for or results of any of the processing steps, calculations, and/or determinations described herein. The processor 920 may be configured to perform any of these processing steps, calculations, and/or determinations. In some embodiments, the power source 940 may be a battery, capacitor, inductor, generator, or other element capable of applying power. Elements 910, 920, 930 and 940 need not exist within a single physical component, for example the memory 910 and/or the processor 920 may be distributed in separate components connected to the other elements of the sensor system.

Figure 10:
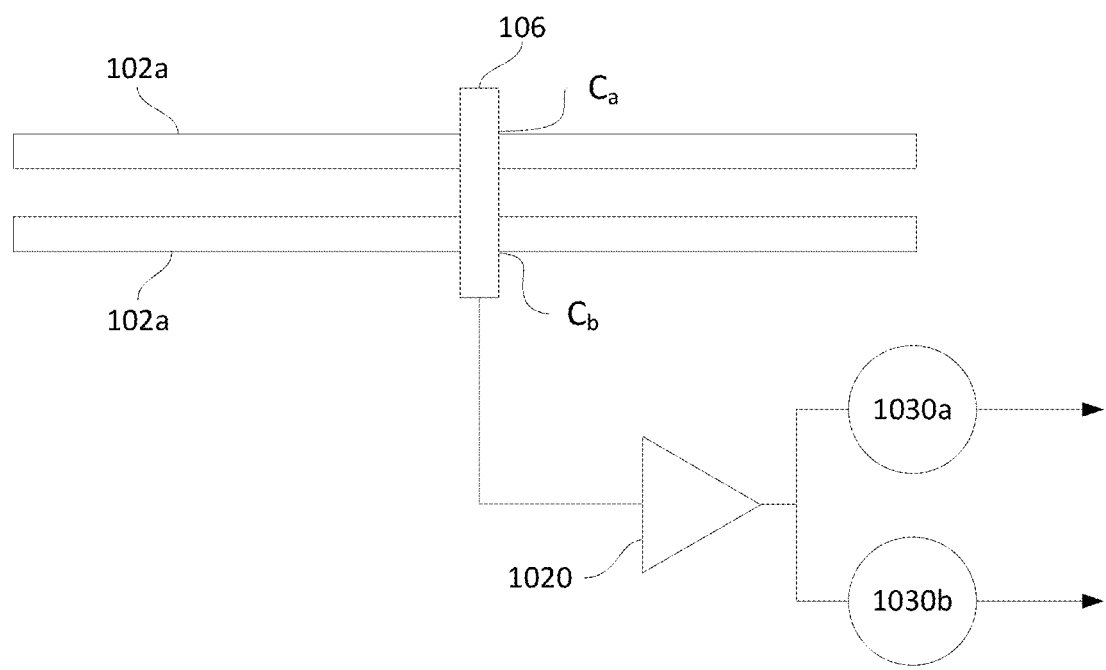
FIG. 10 illustrates an exemplary embodiment of an I/O receiving circuit.

FIG. 10 illustrates an exemplary I/O receiving circuit (e.g., a quadrature demodulator). As shown in FIG. 10, a pickup line 106 may intersect one or more drive lines 102a, 102b. A first driving signal may be applied to the first drive line and a second driving signal may be applied to the second drive line. In some embodiments, the two driving signals may be substantially 90 degrees out of phase with one-another. In some embodiments, the combined signal received by the pickup line 106 may be transmitted to a differential receiver 1020, and the output from the differential receiver 1020 may be transmitted to mixers 1030a, 1030b. The mixers 1030a, 1030b may process the received signal to extract a component that is within an expected phase. For example, if a cosine signal is applied to the first drive line 102a, mixer 1030a may extract a component that is in-phase with that cosine signal. In this manner, the output from mixer 1030a may be proportional to a capacitance $C_a$ at the intersection between drive line 102a and pickup line 106. Similarly, if a sine signal is applied to the second drive line 102b, mixer 1030b may extract a component that is in-phase with that sine signal. In this manner, the output from mixer 1030b may be proportional to a capacitance $C_b$ at the intersection between drive line 102b and pickup line 106.

NUMBERED EMBODIMENTS

Embodiment 1. A system for detecting a user's finger or other element, the system comprising:
a power source;
a memory; and
a processor, wherein the system is configured to:
(a) apply a first electrical signal;
(b) apply a second signal, the second signal being out of phase with the first electrical signal;
(c) using a first electrode, receive a third electrical signal that is powered, at least in part, by the first electrical signal, the third electrical signal being received from a transducing circuit and including an indication as to whether the user's finger or other element is present at a first position;
(d) using the first electrode, receive a fourth electrical signal that is powered, at least in part, by the second electrical signal, the fourth electrical signal including an indication as to whether the user's finger or other element is present at a second position, the fourth electrical signal being received while the third electrical signal is being received;
(e) extract the third electrical signal using a quadrature demodulator;
(f) extract the fourth electrical signal using the quadrature demodulator;
(g) compensate for a phase delay between the first electrical signal and the third electrical signal, the phase delay being associated with the transducing circuit;
(h) based on the third electrical signal, determine a first presence measurement at the first position;
(i) compensating for a phase delay between the second electrical signal and the fourth electrical signal; and
(j) based on the fourth electrical signal, determine a second presence measurement at the second position.

Embodiment 2. The system of embodiment 1, wherein the first position corresponds to a pixel on a sensor matrix, and the second position corresponds to the same pixel.

Embodiment 3. The system of embodiment 1, wherein the first position corresponds to a first pixel on a sensor matrix, and the second position corresponds to a second pixel on the sensor matrix, the second pixel being different than the first pixel.

Embodiment 4. The system of embodiment 1, wherein compensating for the phase delay is performed by modulating the third electrical signal using a phase delay parameter.

Embodiment 5. The system of embodiment 4, wherein the phase delay parameter is determined at least in part by:
applying a fifth signal to the transducing circuit, the fifth signal being substantially in a single phase;
receiving a sixth signal from the transducing circuit; and based on a phase difference between the fifth signal and the sixth signal, calculating the phase delay parameter.

Embodiment 6. The system of embodiment 4, wherein the phase delay parameter is represented by a de-rotation matrix, and the de-rotation matrix is determined at least in part by:
applying a fifth signal to the transducing circuit, the fifth signal being substantially in a single phase;
receiving a sixth signal from the transducing circuit;
determining an in-phase component of the sixth signal;
determining a quadrature component of the sixth signal; and using the in-phase component and the quadrature component of the sixth signal, constructing the de-rotation matrix.

Embodiment 7. The system of embodiment 4, wherein the phase delay parameter is determined at least in part by:
applying a fifth signal to the transducing circuit, the fifth signal having a nonzero in-phase component, a nonzero quadrature component, and a phase angle;
receiving a sixth signal from the transducing circuit;
and determining a value for the phase angle for which at least one of an in-phase component and a quadrature component of the sixth signal is either maximized or substantially zero.

Embodiment 8. The system of any of embodiments 4-7, wherein the phase delay parameter is a predetermined factory calibration parameter.

Embodiment 9. The system of any of embodiments 4-7, wherein the system is further configured to:
determine than an event has occurred; and
in response to determining that the event has occurred, determine a set of phase delay parameters, the set of phase delay parameters comprising the phase delay parameter.

Embodiment 10. The system of any of embodiments 1-9, wherein the system is further configured to repeat steps (a)-(j) with respect to each of a plurality of drive lines in a sensor matrix.

Embodiment 11. A method for detecting a user's finger or other element, the method comprising:
(a) applying a first electrical signal;
(b) applying a second signal, the second signal being out of phase with the first electrical signal;
(c) using a first electrode, receiving a third electrical signal that is powered, at least in part, by the first electrical signal, the third electrical signal being received from a transducing circuit and including an indication as to whether the user's finger or other element is present at a first position;
(d) using the first electrode, receiving a fourth electrical signal that is powered, at least in part, by the second electrical signal, the fourth electrical signal including an indication as to whether the user's finger or other element is present at a second position, the fourth electrical signal being received while the third electrical signal is being received; (e) extracting the third electrical signal using a quadrature demodulator;
(f) extracting the fourth electrical signal using the quadrature demodulator;
(g) compensating for a phase delay between the first electrical signal and the third electrical signal, the phase delay being associated with the transducing circuit;
(h) based on the third electrical signal, determining a first presence measurement at the first position;
(i) compensating for a phase delay between the second electrical signal and the fourth electrical signal; and
(j) based on the fourth electrical signal, determining a second presence measurement at the second position.

Embodiment 12. The method of embodiment 11, wherein the first position corresponds to a pixel on a sensor matrix, and the second position corresponds to the same pixel.

Embodiment 13. The method of embodiment 11, wherein the first position corresponds to a first pixel on a sensor matrix, and the second position corresponds to a second pixel on the sensor matrix, the second pixel being different than the first pixel.

Embodiment 14. The method of embodiment 11, wherein compensating for the phase delay is performed by modulating the third electrical signal using a phase delay parameter.

Embodiment 15. The method of embodiment 14, wherein the phase delay parameter is determined at least in part by:
applying a fifth signal to the transducing circuit, the fifth signal being substantially in a single phase;
receiving a sixth signal from the transducing circuit; and based on a phase difference between the fifth signal and the sixth signal, calculating the phase delay parameter.

Embodiment 16. The method of embodiment 14, wherein the phase delay parameter is represented by a de-rotation matrix, and the de-rotation matrix is determined at least in part by:
applying a fifth signal to the transducing circuit, the fifth signal being substantially in a single phase;
receiving a sixth signal from the transducing circuit;
determining an in-phase component of the sixth signal;
determining a quadrature component of the sixth signal; and using the in-phase component and the quadrature component of the sixth signal, constructing the de-rotation matrix.

Embodiment 17. The method of embodiment 14, wherein the phase delay parameter is determined at least in part by:
applying a fifth signal to the transducing circuit, the fifth signal having a nonzero in-phase component, a nonzero quadrature component, and a phase angle;
receiving a sixth signal from the transducing circuit;
and determining a value for the phase angle for which at least one of an in-phase component and a quadrature component of the sixth signal is either maximized or substantially zero.

Embodiment 18. The method of any of embodiments 14-17, wherein the phase delay parameter is a predetermined factory calibration parameter.

Embodiment 19. The method of any of embodiments 14-17, further comprising:
determining than an event has occurred; and
in response the determination that the event has occurred, determining a set of phase delay parameters, the set of phase delay parameters comprising the phase delay parameter.

Embodiment 20. The method of any of embodiments 11-19, further comprising repeating steps (a)-(j) with respect to each of a plurality of drive lines in a sensor matrix.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system for detecting an object, the system comprising:
a power source;
a memory; and
a processor, wherein the system is configured to:
(a) apply a first electrical signal;
(b) apply a second electrical signal, the second electrical signal being out of phase with the first electrical signal;
(c) using a first electrode, receive a third electrical signal that is powered, at least in part, by the first electrical signal, the third electrical signal being received from a transducing circuit and including an indication as to whether the object is present at a first position;
(d) using the first electrode, receive a fourth electrical signal that is powered, at least in part, by the second electrical signal, the fourth electrical signal including an indication as to whether the object is present at a second position, the fourth electrical signal being received while the third electrical signal is being received;
(e) extract the third electrical signal using a quadrature demodulator;
(f) extract the fourth electrical signal using the quadrature demodulator;
(g) compensate for a phase delay between the first electrical signal and the third electrical signal, the phase delay being associated with the transducing circuit, wherein compensating for the phase delay between the first electrical signal and the third electrical signal comprises shifting a phase of the third electrical signal, a processed version of the third electrical signal, or data obtained from the third electrical signal;
(h) based on the third electrical signal, determine a first presence measurement at the first position;
(i) compensate for a phase delay between the second electrical signal and the fourth electrical signal, wherein compensating for the phase delay between the second electrical signal and the fourth electrical signal comprises shifting a phase of the fourth electrical signal, a processed version of the fourth electrical signal, or data obtained from the fourth electrical signal; and
(j) based on the fourth electrical signal, determine a second presence measurement at the second position.

2. The system of claim 1, wherein the first position corresponds to a pixel on a sensor matrix, and the second position corresponds to the same pixel.

3. The system of claim 1, wherein the first position corresponds to a first pixel on a sensor matrix, and the second position corresponds to a second pixel on the sensor matrix, the second pixel being different than the first pixel.

4. The system of claim 1, wherein compensating for the phase delay is performed by modulating the third electrical signal using a phase delay parameter.

5. The system of claim 4, wherein the phase delay parameter is determined at least in part by:
applying a fifth signal to the transducing circuit, the fifth signal being substantially in a single phase;
receiving a sixth signal from the transducing circuit; and
based on a phase difference between the fifth signal and the sixth signal, calculating the phase delay parameter.

6. The system of claim 4, wherein the phase delay parameter is represented by a de-rotation matrix, and the de-rotation matrix is determined at least in part by:
applying a fifth signal to the transducing circuit, the fifth signal being substantially in a single phase;
receiving a sixth signal from the transducing circuit;
determining an in-phase component of the sixth signal;
determining a quadrature component of the sixth signal; and
using the in-phase component and the quadrature component of the sixth signal, constructing the de-rotation matrix.

7. The system of claim 4, wherein the phase delay parameter is determined at least in part by:
applying a fifth signal to the transducing circuit, the fifth signal having a nonzero in-phase component, a nonzero quadrature component, and a phase angle;
receiving a sixth signal from the transducing circuit;
and determining a value for the phase angle for which at least one of an in-phase component and a quadrature component of the sixth signal is either maximized or substantially zero.

8. The system of claim 4, wherein the phase delay parameter is a predetermined factory calibration parameter.

9. The system of claim 4, wherein the system is further configured to:
determine that an event has occurred; and
in response to determining that the event has occurred, determine a set of phase delay parameters, the set of phase delay parameters comprising the phase delay parameter.

10. The system of claim 1, wherein the system is further configured to repeat steps (a)-(j) with respect to each of a plurality of drive lines in a sensor matrix.

11. The system of claim 1, wherein the first electrical signal is 90 degrees out of phase with the second electrical signal.

12. A method for detecting an object, the method comprising:
(a) applying a first electrical signal;
(b) applying a second electrical signal, the second electrical signal being out of phase with the first electrical signal;
(c) using a first electrode, receiving a third electrical signal that is powered, at least in part, by the first electrical signal, the third electrical signal being received from a transducing circuit and including an indication as to whether the object is present at a first position;
(d) using the first electrode, receiving a fourth electrical signal that is powered, at least in part, by the second electrical signal, the fourth electrical signal including an indication as to whether the object is present at a second position, the fourth electrical signal being received while the third electrical signal is being received; (e) extracting the third electrical signal using a quadrature demodulator;
(f) extracting the fourth electrical signal using the quadrature demodulator;

(g) compensating for a phase delay between the first electrical signal and the third electrical signal, the phase delay being associated with the transducing circuit, wherein compensating for the phase delay between the first electrical signal and the third electrical signal comprises shifting a phase of the third electrical signal, a processed version of the third electrical signal, or data obtained from the third electrical signal;

(h) based on the third electrical signal, determining a first presence measurement at the first position;

(i) compensating for a phase delay between the second electrical signal and the fourth electrical signal, wherein compensating for the phase delay between the second electrical signal and the fourth electrical signal comprises shifting a phase of the fourth electrical signal, a processed version of the fourth electrical signal, or data obtained from the fourth electrical signal; and (j) based on the fourth electrical signal, determining a second presence measurement at the second position.

13. The method of claim 12, wherein the first position corresponds to a pixel on a sensor matrix, and the second position corresponds to the same pixel.

14. The method of claim 12, wherein the first position corresponds to a first pixel on a sensor matrix, and the second position corresponds to a second pixel on the sensor matrix, the second pixel being different than the first pixel.

15. The method of claim 12, wherein compensating for the phase delay is performed by modulating the third electrical signal using a phase delay parameter.

16. The method of claim 15, wherein the phase delay parameter is determined at least in part by:
applying a fifth signal to the transducing circuit, the fifth signal being substantially in a single phase;
receiving a sixth signal from the transducing circuit; and
based on a phase difference between the fifth signal and the sixth signal, calculating the phase delay parameter.

17. The method of claim 15, wherein the phase delay parameter is represented by a de-rotation matrix, and the de-rotation matrix is determined at least in part by:
applying a fifth signal to the transducing circuit, the fifth signal being substantially in a single phase;
receiving a sixth signal from the transducing circuit;
determining an in-phase component of the sixth signal;
determining a quadrature component of the sixth signal; and
using the in-phase component and the quadrature component of the sixth signal, constructing the de-rotation matrix.

18. The method of claim 15, wherein the phase delay parameter is determined at least in part by:
applying a fifth signal to the transducing circuit, the fifth signal having a nonzero in-phase component, a nonzero quadrature component, and a phase angle;
receiving a sixth signal from the transducing circuit;
and determining a value for the phase angle for which at least one of an in-phase component and a quadrature component of the sixth signal is either maximized or substantially zero.

19. The method of claim 15, wherein the phase delay parameter is a predetermined factory calibration parameter.

20. The method of claim 15, further comprising:
determining that an event has occurred; and
in response the determination that the event has occurred, determining a set of phase delay parameters, the set of phase delay parameters comprising the phase delay parameter.

21. The method of claim 12, further comprising repeating steps (a)-(j) with respect to each of a plurality of drive lines in a sensor matrix.

22. The method of claim 12, wherein the first electrical signal is 90 degrees out of phase with the second electrical signal.

* * * * *